US005667290A

United States Patent [19]
Cioletti et al.

[11] Patent Number: 5,667,290
[45] Date of Patent: Sep. 16, 1997

[54] MAGNETO-INDUCTIVELY ACTUATED SAFETY LIGHT

[76] Inventors: Joseph T. Cioletti; Kathryn J. Cioletti, both of 684 Blue Ridge Dr., Pittsburgh, Pa. 15239

[21] Appl. No.: 547,413

[22] Filed: Oct. 24, 1995

[51] Int. Cl.⁶ .................................................. B60Q 1/26
[52] U.S. Cl. .................. 362/72; 362/234; 362/276; 362/800; 362/802; 340/432; 340/463
[58] Field of Search .................. 362/72, 78, 192, 362/276, 802, 800, 234; 340/432, 463; 200/60

[56] References Cited

U.S. PATENT DOCUMENTS

| | | | |
|---|---|---|---|
| 3,735,298 | 5/1973 | Colby | 340/463 |
| 3,827,024 | 7/1974 | Anderson et al. | 340/463 |
| 4,019,171 | 4/1977 | Martelet | 340/432 |

FOREIGN PATENT DOCUMENTS 135850  6/1991  Japan .................................... 362/78

Primary Examiner—Stephen F. Husar
Assistant Examiner—Alan Cariaso

[57] ABSTRACT

High intensity light emitting diodes, visible even in daylight, provide observers with a distinct visual warning that a bicycle is in motion. This is accomplished using a magnet or series of magnets attached to one or both rotating wheels; said magnets being capable of actuating one or more reed switches. The reed switch contact is connected to an electronic circuit having power handling ability far beyond the capacity of the reed switch alone. Included in the circuit is a timing feature which limits the length of time the light emitting diodes are illuminated even if a magnet should maintain a reed switch continuously actuated. Major power drain occurs only during the flashing period of the light emitting diodes. Otherwise, power drain is of such low intensity that no shut off switch is needed; allowing the safety indicator to be active at all times. Both light intensity and flash duration are independent of a wheel's rotational speed or direction of rotation.

1 Claim, 2 Drawing Sheets

MAGNETO-INDUCTIVELY ACTUATED SAFETY LIGHT

FIELD OF THE INVENTION

The present invention is related to safety lights.

BACKGROUND OF THE INVENTION

The magneto-inductively actuated safety light arose from the need for protecting bicyclists, especially nocturnally and in heavy traffic areas, which is of paramount concern and led to the herein described invention. Other devices such as reflectors, running lights, and oscillator driven flashers are available. A flashing light attracts more attention than a steady light and one that flashes in accord with bicycle motion will provide better information to approaching vehicles or pedestrians.

The principle of operation of the below described devices is the generation of a contact closure produced by the proximity of a magnet to a "reed switch". A magnet attached to a moving member allows contact-free operation, providing the required magnetic flux to actuate a reed switch without impediment to the motion itself. In its simplest form, the contact closure completes a circuit which provides the requisite current flow through warning lights. With the magnet(s) attached to spokes on a bicycle wheel and properly aligned with the reed switch, contact closure only occurs whenever the magnet moves past the reed switch during its path of travel. With only one magnet attached to a bicycle wheel, the closure would occur once per revolution of the wheel. Switch actuation is both independent of wheel direction or the direction of the magnetic field. Multiple magnets mounted at the same radial distance and angularly displaced from each other would generate multiple switch closures for each revolution of the wheel.

SUMMARY OF THE INVENTION

The machine described herein is a magneto-inductively actuated safety light comprising: a magnet member used for attachment to a moving member; a reed switch for attachment to a stationary member within actuating distance of the magnet member; and an electronic circuit in electrical communication with the reed switch. The electronic circuit lights which is activated each time the magnet member activates the reed switch such that light are emitted in proportion to the frequency of actuation of the reed switch by the magnet member. Moreover, the magneto-inductively actuated safety light has an electronic circuit which has a mechanism for limiting pulse duration of the light, in order to conserve battery life.

BRIEF DESCRIPTION OF THE DRAWINGS

FIG. 2b is a side view of the same arrangement in FIG. 2a.

DESCRIPTION OF PREFERRED EMBODIMENT

Figure 1:
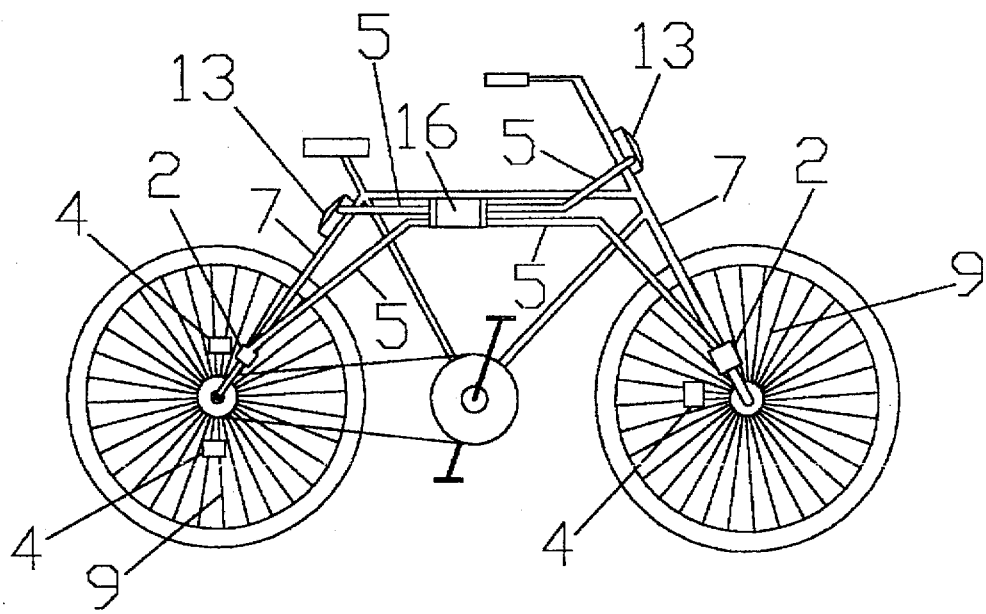
FIG. 1 depicts the magneto-inductively actuated safety light system as applied to a bicycle.

FIG. 1 depicts one embodiment wherein a bicycle is equipped with Reed Switch Blocks, (2), on both front and rear Yokes, (7), and with the rear wheel carrying two Magnet Blocks, (4). The Power Block, (16), is shown mounted to the bicycle's horizontal frame member. This is only one of many possible arrangements.

Figure 2A:
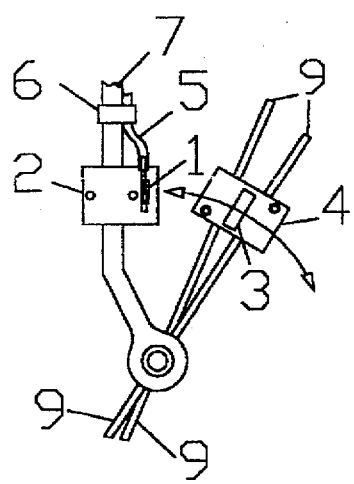
FIG. 2a depicts a detailed mounting of reed switch and magnet member as applied to a bicycle.
Figure 2B:
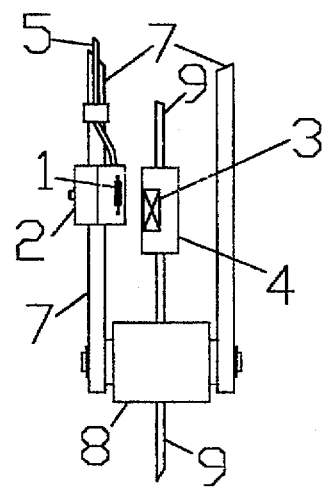
Figure 3:
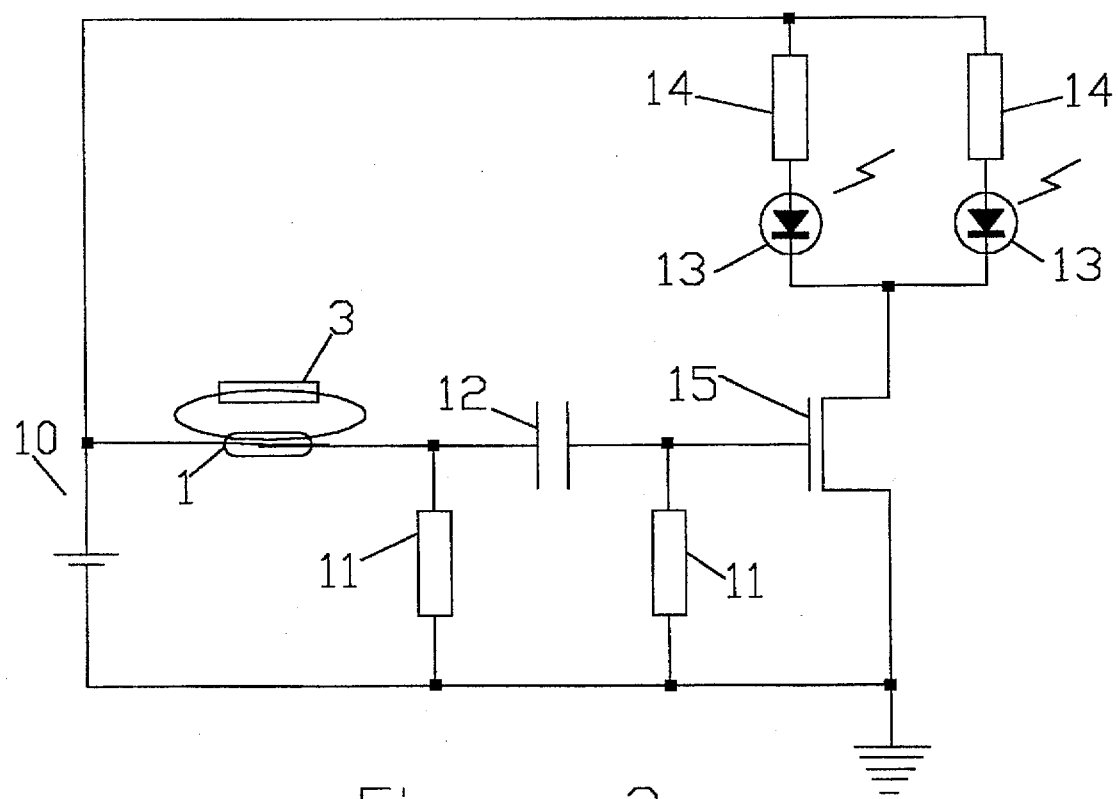
FIG. 3 depicts a preferred embodiment of an electronic circuit which has a mechanism for limiting pulse duration of the light, in order to conserve battery life.

FIG. 2a and its side view thereof FIG. 2b in conjunction with the circuit described in FIG. 3 is the preferred embodiment of this device because it offers the best potential for further development. FIG. 2a and its side view thereof FIG. 2b depicts the mechanical arrangement of the Reed Switch, (1), and Magnet, (3), when mounted to the bicycle frame. In this embodiment, the Reed Switch, (1), is encased in a Reed Switch Block, (2), which is mounted on one line of the front or rear wheel fork, (7). The Magnet, (3), is encased in a Magnet Block, (4), and depicted as being clamped to adjacent spokes, (9), on the wheel, as close as practicable to the Hub, (8), which insures minimal wheel unbalance at high speed operation. Alternatively, a second magnet located on the same wheel radius 180 Degrees away would automatically provide balance while permitting more latitude for radial positioning of the Reed Switch, (1).

The Reed Switch, (1), is encapsulated in its mounting block, (2), and electrically connected to a two conductor cable, (5). The cable conductors are separated and individually connected to the opposite ends of the Reed Switch, (1). These conductors will become electrically connected when the Reed Switch, (1), closes. Proper alignment is readily established by first attaching the Magnet Block, (4), to adjacent spokes at the desired radius, rotating the wheel to align the Magnet Block, (4), with the Yoke, (7), then adjusting the Reed Switch Block, (2), along the Yoke, (7), until the Light Emitting Diode(s) (LEDs) light up. The Reed Switch Block, (2), is then clamped at that position. If additional magnets are used, the wheel would be rotated to align and clamp each Magnet Block, (4), with the Reed Switch Block, (2), position.

FIG. 3 is the schematic representation depicting an application of the herein described active circuit interfaced with a Reed Switch, (1). FIG. 3 shows said Reed Switch,(1), activated by magnetic flux emanating from Magnet, (3). The active device in this circuit is the MOS-FET, (15), (field-effect transistor); a device requiring extremely small current flows to its gate in order to connect the source and drain lines thus permitting current flow through the lights. Note that the MOS-FET, (15) can be replaced with other devices such as Transistors or Operational Amplifiers. The very high input resistance tendered by the MOS-FET, (15), gate allows the use of a very high resistance, (11), at the common connection between the Reed Switch, (1), and the capacitor, (12). This eliminates the need for an on/off switch since, even if the Reed Switch, (1), is actuated by the Magnet, (3), and remains in that position, the capacitor, (12), will become charged and no longer pass current. Consequently, the only current drawn is limited by the above mentioned resistor, (11). When this condition exists, the same voltage is applied to both the gate and the source of the MOS-FET, (15), and the MOS-FET, (15), will be turned off, thus precluding the possibility of the LEDs, (13), remaining lit if the actuating magnet maintains closure of the Reed Switch, (1). Upon removal of the magnetic flux, the Reed Switch, (1), opens and the capacitor, (12), will discharge through the two series resistors, (11), causing the MOS-FET, (15), to be reset and ready for the next Reed Switch, (1), closure.

The LEDs, (13), will be switched on and off as the wheel rotates and the Magnet, (3), produces momentary closures of the Reed Switch, (1), but only if the Capacitor, (12), has sufficient time to discharge between Reed Switch, (1), closures. This criterion is readily met due to the high gate resistance of the MOS-FET, (15), which permits the selection of a wide range of values for the capacitor, (12). Characteristically, an uncharged Capacitor, (12), will offer no resistance to current flow to a suddenly applied voltage. However, over a period of time the Capacitor, (12), will become charged, producing an opposing voltage which will reduce MOS-FET, (15) gate voltage to zero. The instant that the Reed Switch, (1), is closed by the transiting Magnet, (3), the full Battery, (10), voltage is impressed between the MOS-FETs, (15), gate and source causing the MOS-FET, (15), to turn on the LEDs, (13), until the capacitor (12) is charged to a voltage such that the resulting voltage drop across the resistor (11) at the gate of the MOS-FET, (15), drops below its threshold activation. Shortly thereafter the Reed Switch, (1), opens and the Capacitor, (12), will discharge through both resistors, (11). The discharge time is proportional to:

Time=(Resistor 1+Resistor 2)* Capacitance

This allows for a broad selection of resistor/capacitor combinations as a means for controlling the discharge rate of the capacitor, (12) such that the LED's, (13), will instantly emit full light intensity as the Reed Switch, (1), closes then to slowly lose intensity between Magnet, (3), actuation. This feature would provide a unique signature to an observer.

Construction of the above described machines would be modular for bicycle installations but is not limited thereto. One alternate construction would incorporate the Reed Switch, (1), Battery, (10), and electronic circuit, (depicted in FIG. 3), inside a single container leaving only the Magnet Block, (3), as an external non-contacting coupling to the Reed Switch, (1). For permanent installations, the device can be readily adapted to operate from standard power distributions such as 110 volt, 60 Hertz thus eliminating dependency on a battery supply.

A minimally complete unit for a bicycle would be comprised of (using FIG. 1) one Reed Switch Block, (2), one Magnet Block, (4), one LED, (13), and one Power Unit, (16). The Power Unit, (16), would be designed to interface with the Reed Switch, (2), and LED, (13), using cable(s), (5). Internally, the Power Unit (16), would contain a suitable battery holder. Some of these units would be designed to hold Lantern, Edison, or rechargeable type batteries—larger batteries will last longer. It could also contain the active element control described above and shown schematically in FIG. 3.

The machine described herein can be adapted to other rotating or oscillating devices such as pulleys, gears, and pistons. These motions can be detected by the Reed Switch, even if their movement is not visible, provided that a non-magnetic safety guard or cover occludes direct viewing.

This feature would provide a warning to maintenance personnel that moving equipment lies behind the panel or cover. Indication of rotating or non-rotating machinery is not ambiguous using the preferred embodiment of this invention. Since no on-off switch is required, the safety indicator is active at all times and requires no human interface to turn it on.

Various materials could be used for construction. However, primary considerations would include the ability of the components to be corrosion resistant, non magnetic whereever needed, and would provide weatherproof sealing of all components to the fullest extent practical.

We claim:

1. A safety device for detecting and annunciating one of rotational and reciprocal motion using stationary magnetically actuated switches, said switches receiving magnetic signals produced by moving magnet members, said switches providing minuscule signals to a battery driven power control circuit capable of rapidly switching light emitting diodes or LED's, or incandescent lamps and comprising:

a.) one or more said moving magnet members attached to a support movable in one of rotational and reciprocal motion, b.) one or more said magnetically actuated switches in communication with said magnet members, c.) said magnetically actuated switches providing signals to said power control circuit, d.) said minuscule signals comprise conducting currents that are considerably lower than current carrying capacity of said magnetically actuated switches insuring extremely long life, e.) said power control circuit uses a capacitor and resistors to limit length of time said LED's are lit, f.) said capacitor and resistors can be substituted with capacitor and resistors of different values to control on time and additional magnets attached to said support movable in one of rotational and reciprocal motion to create a unique user flashing pattern of said LED's for motion identification, g.) said limiting of the on time of said LED's eliminating any need for disabling said power control circuit thereby extending battery life and ensuring said power control circuit is active at all times, h.) said power control circuit including a solid state field effect device with high power and rapid response capabilities suitable for driving said LED's or said incandescent lamps.

* * * * *